(12) United States Patent
Higashi et al.

(10) Patent No.: US 7,748,742 B2
(45) Date of Patent: Jul. 6, 2010

(54) ENERGY ABSORBING STEERING SYSTEM

(75) Inventors: Kenji Higashi, Tenri (JP); Shiro Nakano, Minamikawachi-gun (JP); Kazuya Yoshioka, Kashiwara (JP); Yasuyuki Yoshii, Souraku-gun (JP); Shimon Jimbo, Kashiwara (JP)

(73) Assignee: JTEKT Corporation, Osaka-shi (JP)

( * ) Notice: Subject to any disclaimer, the term of this patent is extended or adjusted under 35 U.S.C. 154(b) by 77 days.

(21) Appl. No.: 12/109,957

(22) Filed: Apr. 25, 2008

(65) Prior Publication Data

US 2008/0272582 A1   Nov. 6, 2008

(30) Foreign Application Priority Data

Apr. 27, 2007  (JP) .............................. 2007-119319

(51) Int. Cl.
 *B62D 1/00* (2006.01)
(52) U.S. Cl. .................................................. 280/777
(58) Field of Classification Search ................ 280/777; 74/492, 493; 188/371, 377
 See application file for complete search history.

(56) References Cited

U.S. PATENT DOCUMENTS

| 3,677,106 | A |   | 7/1972  | Weston |
| 3,747,427 | A | * | 7/1973  | Milton et al. ................. 74/492 |
| 3,760,650 | A | * | 9/1973  | Pardy ........................... 74/492 |
| 3,805,636 | A | * | 4/1974  | Howes ......................... 74/492 |
| 5,193,848 | A | * | 3/1993  | Faulstroh .................... 280/775 |
| 5,368,330 | A | * | 11/1994 | Arnold et al. ............... 280/777 |
| 5,562,306 | A | * | 10/1996 | Rispeter ...................... 280/775 |
| 5,906,250 | A |   | 5/1999  | Haga et al. |
| 6,896,290 | B2 | * | 5/2005  | Lutz ............................ 280/777 |
| 6,908,109 | B2 | * | 6/2005  | Lutz ............................ 280/777 |

FOREIGN PATENT DOCUMENTS

| DE | 29 11 021 A1 | 10/1980 |
| DE | 198 29 239 A1 | 1/1999 |
| EP | 1 344 708 A2 | 9/2003 |
| JP | 2000-159043 | 6/2000 |

\* cited by examiner

*Primary Examiner*—Faye M. Fleming
(74) *Attorney, Agent, or Firm*—Oblon, Spivak, McClelland, Maier & Neustadt, L.L.P.

(57) ABSTRACT

In an energy absorbing steering system including a steering shaft to which a steering member is coupled, and a steering column that rotatably supports the steering shaft, at least one of the steering shaft and the steering column includes an impact absorbing portion that contracts when a load equal to or higher than a predetermined value is applied, and the impact absorbing portion includes a first impact absorbing portion having a first impact absorption load, and a second impact absorbing portion having a second impact absorption load different from the first impact absorption load.

18 Claims, 7 Drawing Sheets

ENERGY ABSORBING STEERING SYSTEM

INCORPORATION BY REFERENCE

The disclosure of Japanese Patent Application No. 2007-119319 filed on Apr. 27, 2007, including the specification, drawings and abstract, is incorporated herein by reference in its entirety.

BACKGROUND OF THE INVENTION

1. Field of the Invention

This invention relates to energy absorbing steering systems.

2. Description of Related Art

An energy absorbing steering system is proposed which absorbs impact energy when an interior impact occurs upon a collision of the driver with a steering member, such as a steering wheel, following a collision of a vehicle with another vehicle or object. An example of the energy absorbing steering system is disclosed in Japanese Patent Application Publication No. 2000-159043 (JP-A-2000-159043).

In the energy absorbing steering system as disclosed in JP-A-2000-159043, a steering shaft, or the like, undergoes plastic deformation and contract upon occurrence of an interior impact, so as to absorb impact energy. In this system, it is preferable to deform the steering shaft, or the like, in a desired manner, so as to provide an intended impact absorbing effect.

SUMMARY OF THE INVENTION

The invention provides an energy absorbing steering system that absorbs impact energy in a desired manner.

An energy absorbing steering system according to a first aspect of the invention includes a steering shaft to which a steering member is coupled, and a steering column that rotatably supports the steering shaft, and at least one of the steering shaft and the steering column includes an impact absorbing portion that contracts when an interior impact occurs. In this system, the impact absorbing portion includes a first impact absorbing portion having a first impact absorption load, and a second impact absorbing portion having a second impact absorbing load.

According to the first aspect of the invention, one of the first and second impact absorbing portions, for which the impact absorption load is set to be relatively small, may contract before the other impact absorbing portion for which the impact absorption load is set to be relatively large contracts. Thus, contraction of the impact absorbing portion may be initiated from a desired location, whereby the impact absorption can be effected in a desired manner.

In the energy absorbing steering system according to the first aspect of the invention, the impact absorbing portion may include a first corrugated tube, and a second corrugated tube that covers a part of the first corrugated tube, and the first impact absorbing portion may consist of a part of the first corrugated tube which is not covered with the second corrugated tube, while the second impact absorbing portion may consist of the above-indicated part of the first corrugated tube which is covered with the second corrugated tube.

In this case, even if impact energy is applied from the driver to the steering shaft in a direction that is inclined relative to the axial direction of the steering shaft, whereby a bending load is applied to the impact absorbing portion, the first and second corrugated tubes that constitute the impact absorbing portion can contract while bending. Accordingly, the impact absorbing portion absorbs impact energy regardless of the direction of application of the impact energy. Furthermore, the impact absorbing portion may be bent at a boundary portion between the first and second impact absorbing portions. Thus, the impact absorbing portion may be bent at a desired location so that the impact absorption or energy absorption is effected in a more appropriate manner.

In the energy absorbing steering system according to the first aspect of the invention, the first and second impact absorbing portions may include corrugated tubes that extend continuously from each other and have different thicknesses. In this case, it is possible to set different impact absorption loads, using a single corrugated tube, while reducing the number of components.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Figure 1:
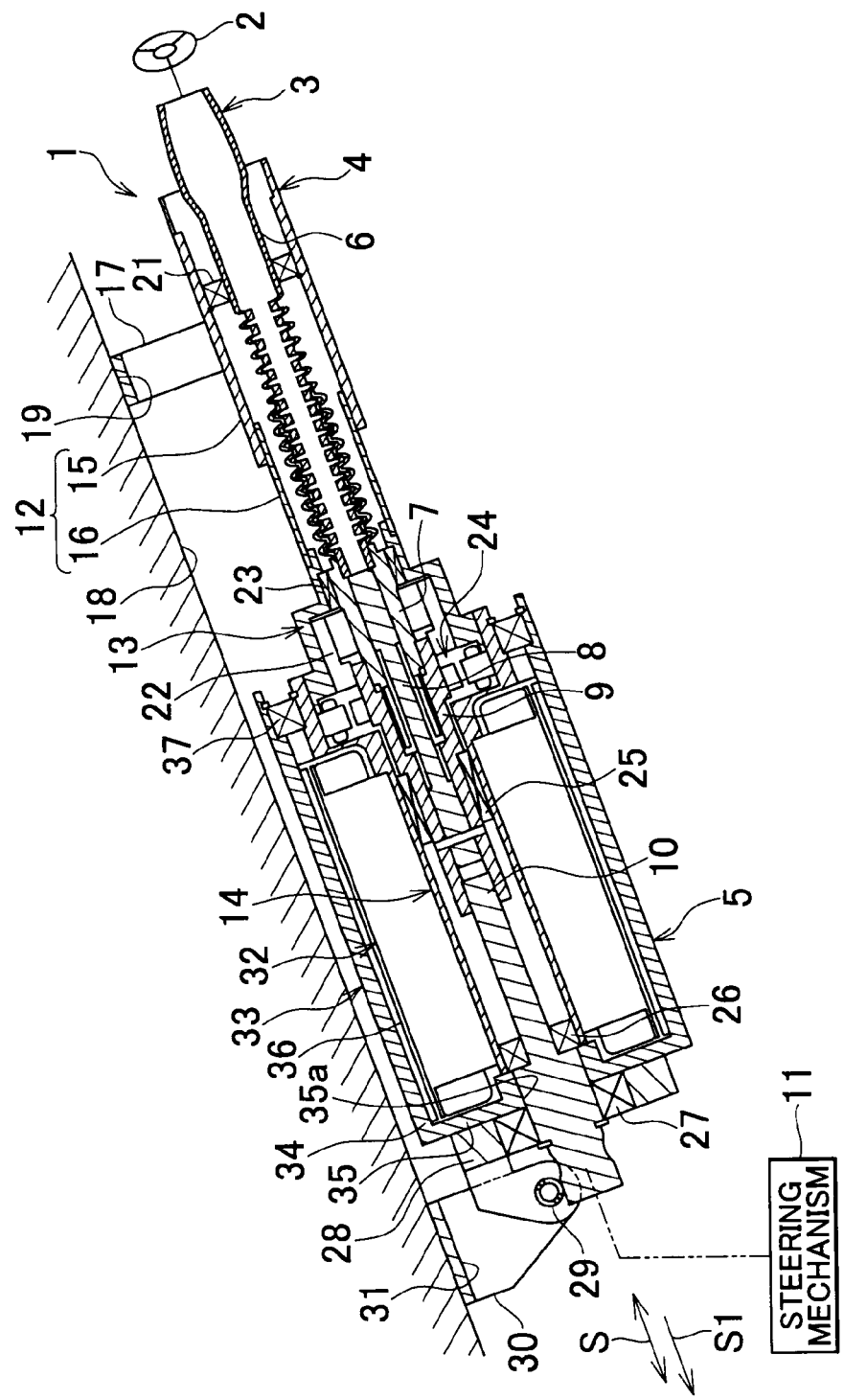
FIG. 1 is a schematic cross-sectional view showing the construction of an electric power steering system as an energy absorbing steering system according to one embodiment of the invention.

Example embodiments of the invention will be described with reference to the accompanying drawings, FIG. 1 is a schematic cross-sectional view of the construction of an electric power steering system 1 as an energy absorbing steering system according to one embodiment of the invention. Referring to FIG. 1, the electric power steering system 1 includes a steering shaft 3 coupled to a steering member 2, such as a steering wheel, a steering column 4 that supports the steering shaft 3 such that the steering shaft 3 is freely rotatable, and an electric motor 5 that provides steering assist, which is coupled to the steering shaft 3.

The steering shaft 3 includes a plurality of shafts. More specifically, the steering shaft 3 includes a first shaft 6 having one end to which the steering member 2 is fixed, a second shaft 7 coupled to the first shaft 6 and that is rotatable with the first shaft 6, a third shaft 9 connected to the second shaft 7 via a torsion bar 8 that is rotatable relative to the second shaft 7, and a fourth shaft 10 coupled to the third shaft 9 that is rotatable with the third shaft 9. The steering column 4 restricts movements of the second shaft 7 in an axial direction S1 (i.e., toward the lower end) of the steering shaft 3. The second shaft 7 and the third shaft 9 are arranged to rotate together when the amount of rotation of these shafts 7, 9 relative to each other exceeds a specified range. The fourth shaft 10 is connected to a steering mechanism 11 that includes a rack-and-pinion mechanism and so forth, via an intermediate shaft (not shown), etc.

Steering torque of the steering member 2 is transmitted to the steering mechanism 11 via the steering shaft 3 and others, so that steering or turning of steerable road wheels (not shown) is accomplished. The steering column 4, which has a cylindrical shape, includes a first column tube 12, a second column tube 13 that is connected to the first column tube 12, and a third column tube 14 that is connected to the second column tube 13.

The first column tube 12 is formed from a steel pipe, and surrounds the first shaft 6. The first column tube 12 includes an upper column tube 15, and a lower column tube 16 fitted in the upper column tube 15 such that the upper and lower column tubes 15, 16 can slide relative to each other. The upper column tube 15 is a high-rigidity member having a relatively large thickness, and has relatively high flexural rigidity. An upper bracket 17 is attached to the upper column tube 15. The upper bracket 17 serves to mount the upper column tube 15 on a vehicle body 18, and is supported by a support portion 19 of the vehicle body 18. The upper bracket 17 is supported on the support portion of the vehicle body 18 with a certain load-bearing capacity, and is arranged to be released from the support portion 19 when a specified amount of impact load or more is applied to the upper bracket 17 along one direction S1 of an axis of the steering shaft 3.

The upper column tube 15 supports the first shaft 6 via a bearing 21 such that the first shaft 6 is freely rotatable but cannot move relative to the upper column tube 15 in the axial directions S. The lower column tube 16 is a low-rigidity member having a relatively small thickness, and has relatively low flexural rigidity. The lower column tube 16 is fitted in one end portion of the upper column tube 15. The lower column tube 16 is adapted to bend when a bending load equal to or greater than a specified value is applied to the first column tube 12.

One end portion of the lower column tube 16 is fitted on one end portion of the second column tube 13, such that movements of the low column tube 16 in one direction S1 of the axis of the steering shaft 3 (toward the lower end) are restricted. The second column tube 13 surrounds the second shaft 7, torsion bar 8 and a part of the third shaft 9, and a torque sensor 22 is housed in the second column tube 13. The torque sensor 22 detects the amount of relative rotation between the second shaft 7 and the third shaft 9, so as to detect torque applied to the steering shaft 3.

The second column tube 13 rotatably supports the second shaft 7 via a bearing 23. One end of the third column tube 14 is fixed to the other end of the second column tube 13. A resolver 24 that detects the rotational position of a rotor 33 (which will be described) of the electric motor 5 is housed in one end portion of the third column tube 14. An intermediate portion of the third column tube 14 rotatably supports the third shaft 9 via a bearing 25. The other end portion of the third column tube 14 rotatably supports the fourth shaft 10 via a bearing 26. The fourth shaft 10 is rotatably supported by a lower movable bracket 28 via a bearing 27. The lower movable bracket 28 is pivotably supported by a lower fixed bracket 30 via a pivot shaft 29. The lower fixed bracket 30 is fixed to a securing portion 31 of the vehicle body 18.

The electric motor 5 may be a so-called outer rotor type electric motor in which a rotor is placed outside a stator, and consists of a brushless motor disposed coaxially with the steering shaft 3. The electric motor 5 includes a stator 32 fixed on the periphery of the third column tube 14, and the above-mentioned rotor 33 that surrounds the stator 32. The rotor 33 is shaped like a cup whose upper end is open, and includes a cylindrical sleeve 34 and an end wall 35 formed at one end of the sleeve 34. A plurality of permanent magnets 36 are fixed to the inner circumferential surface of the sleeve 34. The end wall 35 is rotatable with the sleeve 34. The fourth shaft 10 is press-fitted and fixed in a circumferential wall of a through-hole 35a of the end wall 35. With this arrangement, the rotor 33 and the fourth shaft 10 are rotatable together as a unit.

The other end portion of the sleeve 34 is supported by the third column tube 14 via a bearing 37, such that the sleeve 34 is freely rotatable. The sleeve 34 also serves as a housing of the electric motor 5. An ECU (Electronic Control Unit) (not shown) controls the electric motor 5 via a drive circuit, based on the results of detection of the torque sensor 22, a vehicle speed sensor (not shown) and other sensors. The torque of the electric motor 5 is given to the fourth shaft 10 of the steering shaft 3 as steering assist force.

Figure 2:
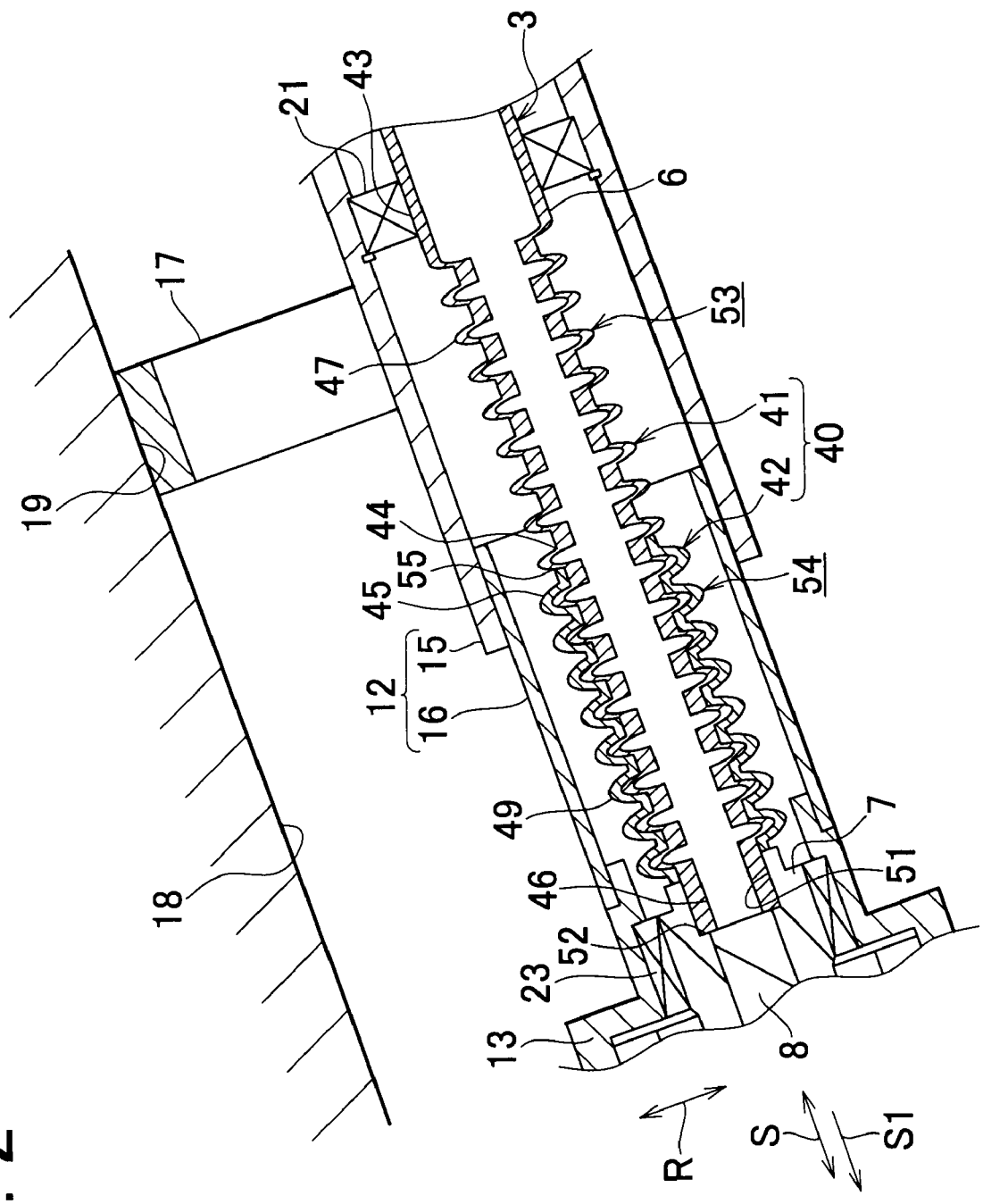
FIG. 2 is an enlarged view of a principal part of the electric power steering system of FIG. 1.

FIG. 2 is an enlarged view of a principal part of the electric power steering system of FIG. 1. Referring to FIG. 2, this embodiment is characterized in that the steering shaft 3 is provided with an impact absorbing portion 40 that contracts in response to an interior impact, and that the impact absorbing portion 40 includes first and second impact absorbing portions 41, 42 for which different impact absorption loads are set. More specifically, the first shaft 6 of the steering shaft 3 is formed of a material, such as metal, having appropriate elasticity, and includes a cylindrical portion 43 on which the bearing 21 is fitted, a first corrugated tube 44 that extends from the cylindrical portion 43 in one direction S1 of the axis of the steering shaft 3, a second corrugated tube 45 that covers a part of the first corrugated tube 44, and a connecting portion 46 that extends from the first corrugated tube 44 in one S1 of the axial directions S and is connected to the second shaft 7.

For example, the cylindrical portion 43, first corrugated tube 44 and the connecting portion 46 may be formed integrally from a single member. The first corrugated tube 44 has a bellows-like portion 47, that contracts in the axial directions S. The second corrugated tube 45 is shaped in accordance with the shape of the first corrugated tube 44, and has a bellows-like portion 49.

The second corrugated tube 45 covers the entire circumference of a part of the first corrugated tube 44 located on the S1 side (lower side) as viewed in the axial directions S, such that the inner circumferential surface of the second corrugated tube 45 contacts the outer circumferential surface of the first corrugated tube 44. One end of the second corrugated tube 45 abuts the one end of the second shaft 7 so that movement of the second corrugated tube 45 in axial directions S1 is restricted.

The connecting portion 46 is received in a hole 51 formed in one end portion of the second shaft 7, and an end face of the connecting portion 46 abuts an annular stepped portion 52 of the second shaft 7, so that movement of the connecting portion 46 in axial direction S1 is restricted. The first impact absorbing portion 41 consists of a non-superimposed region 53 of the first corrugated tube 44, where the second corrugated tube 45 is not superimposed over the first corrugated tube 44. The second impact absorbing portion 42 consists of a superimposed region 54, where the second corrugated tube 45 is superimposed over the first corrugated tube 44.

In the superimposed region 54, the first and second corrugated tubes 44, 45 contract as a unit in the axial direction S. The impact absorption load of the first impact absorbing portion 41 is set to be relatively low, and the impact absorption load of the second impact absorbing portion 42 is set to be relatively high. Thus, the impact absorption load of the second impact absorbing portion 42 is higher than that of the first impact absorbing portion 41. The "impact absorption load" means a load under which the impact absorbing portion 41, 42 undergoes plastic deformation, for example, contracts in the axial directions S.

The first and second impact absorbing portions 41, 42 have a boundary portion 55, at which these impact absorbing portions 41, 42 are connected. Referring to FIG. 1, if an exterior impact arises from a collision of a vehicle in which the electric power steering system 1 is installed, with another vehicle or object, and an interior impact then arises from a collision of the driver with the steering member 2, following the exterior impact, an impact load received from the steering member 2 is transmitted to the upper bracket 17 via the first shaft 6, bearing 21 and the upper column tube 15.

Figure 3:
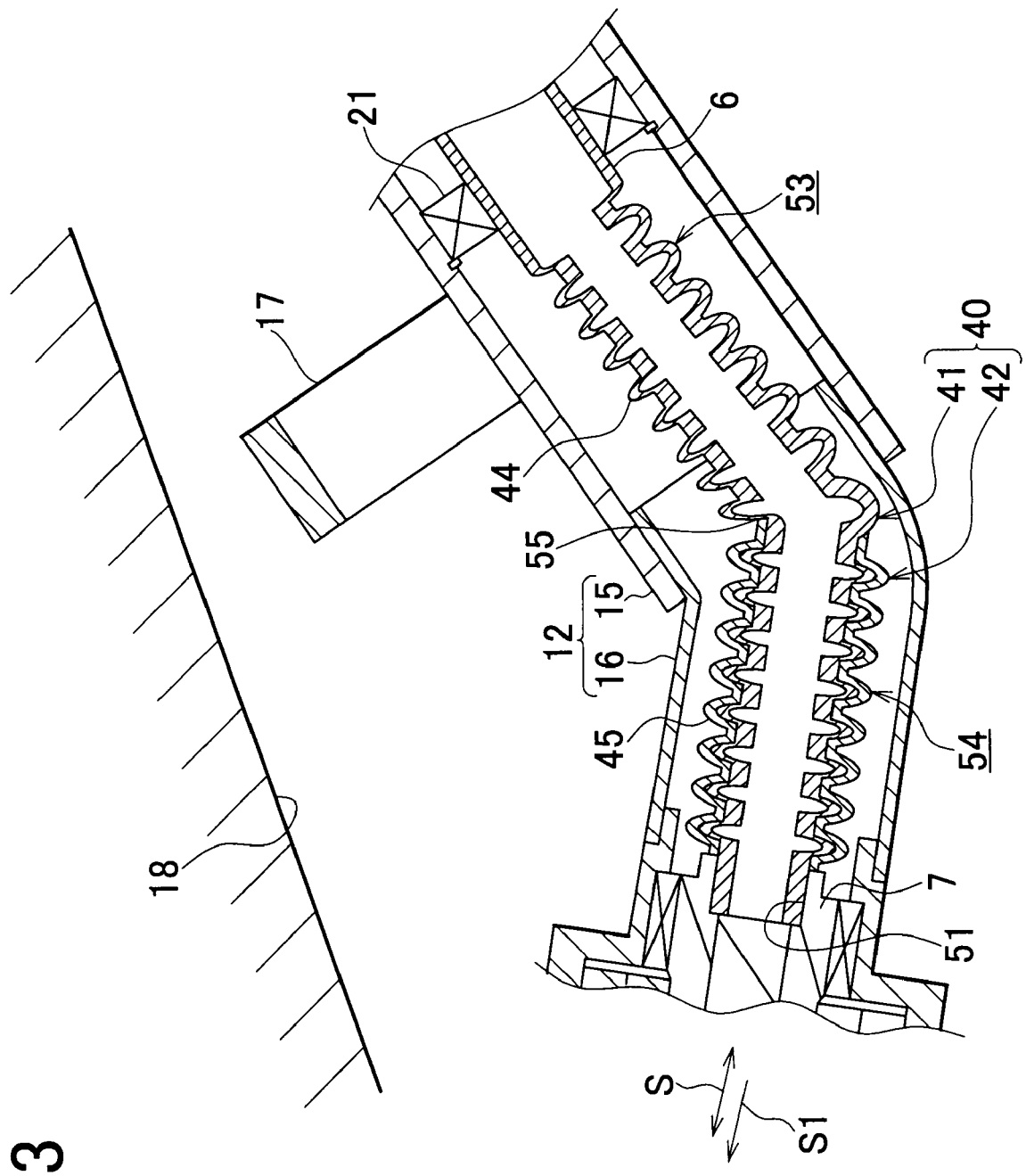
FIG. 3 is a cross-sectional view showing movements of the principal part of FIG. 2 when an interior impact occurs.

If the impact load transmitted to the upper bracket 17 is equal to or greater than a predetermined value, the upper bracket 17 is released from the support portion 19 of the vehicle body 18. As a result, the steering column 4 becomes pivotable about the pivot shaft 29. For example, if an impact load is applied to the steering member 2 in a direction that is inclined relative to the axial directions S, in a condition as shown in FIG. 1 in which no impact load is applied to the steering shaft 3, a bending load is applied to the first shaft 6. As a result, the first shaft 6 bends at the boundary portion 55, in other words, the first impact absorbing portion 41 pivots about the boundary portion 55 relative to the second impact absorbing portion 42, as shown in FIG. 3. At the same time, a bending load is applied to the first column tube 12, whereby the lower column tube 16 is deformed and bent by the upper column tube 15.

According to this embodiment, the first impact absorbing portion 41 for which the impact absorption load is set to be relatively small contracts before the second impact absorbing portion 42 for which the impact absorption load is set to be relatively large contacts. Thus, contraction of the impact absorbing portion 40 may be started from a desired portion (the first impact absorbing portion 41). Consequently, impact absorption or energy absorption may be effected in a desired manner.

Also, even if a bending load is applied to the impact absorbing portion 40, for example, if impact energy is applied from the driver to the steering shaft 3 in a direction that is inclined relative to the axial directions S, the first and second corrugated tubes 44, 45 that constitute the impact absorbing portion 40 are able to contract while bending. Thus, the impact absorbing portion 40 absorbs impact energy, regardless of the direction of application of the impact energy.

Furthermore, bending may be induced in the impact absorbing portion 40 at the boundary portion 55 between the first and second impact absorbing portions 41, 42. Because the impact absorbing portion 40 may be bent at a desired location in this manner, the impart absorption may be effected in a further desired manner. Moreover, the first impact absorbing portion 41 is located closer to the steering member 2, so that the impact absorbing portion 40 is mainly bent at a location far from the pivot shaft 29. Consequently, the impact absorbing portion 40 is prevented from bending by a large degree, and the bent portion is prevented from largely protruding toward the driver.

Also, the electric motor 5, which is in the form of the outer rotor type motor, provides a large area over which the permanent magnets 36 of the rotor 33 are opposed to the stator 32. Accordingly, the electric motor 5 is able to produce high torque. Furthermore, the bearing 27 is firmly retained by the lower movable bracket 28 and the lower fixed bracket 30, whereby the axis of the rotor 33 is prevented from being displaced or shifted when the electric motor 5 is driven.

Figure 4:
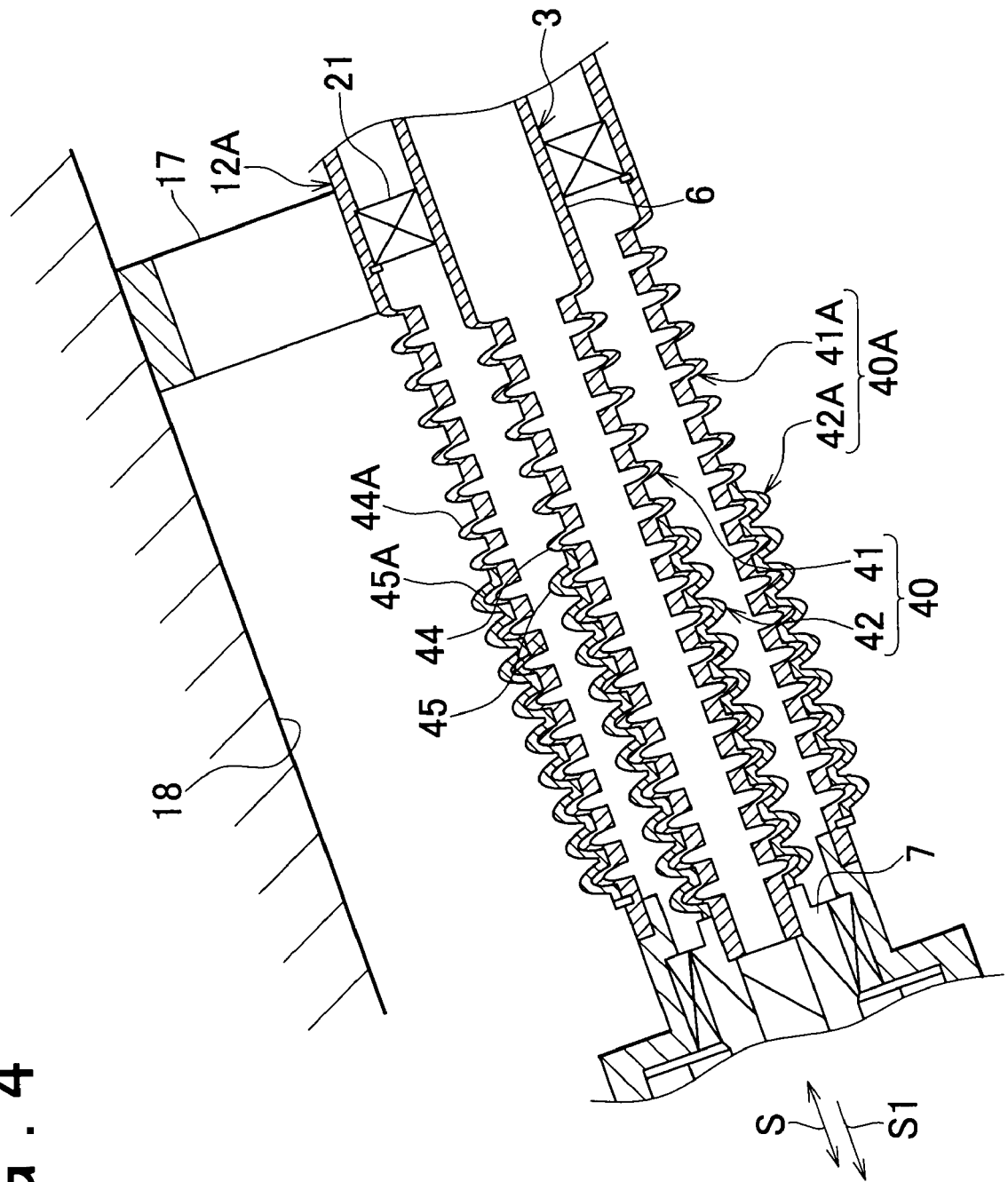
FIG. 4 is a cross-sectional view of a principal part of an energy absorbing steering system according to another embodiment of the invention.

It is to be understood that the invention is not limited to details of the illustrated embodiment, but may be embodied with various changes or modifications. For example, a first column tube 12A may include first and second corrugated tubes 44A, 45A, which constitute an impact absorbing portion 40A, as shown in FIG. 4. In the following, the modified embodiment of FIG. 4 will be described mainly in terms of its features different from those of the embodiment as shown in FIG. 1-FIG. 3, and the same reference numerals as used in FIG. 1-FIG. 3 are used for identifying the same or corresponding members or elements, of which no further explanation will be provided.

Figure 5:
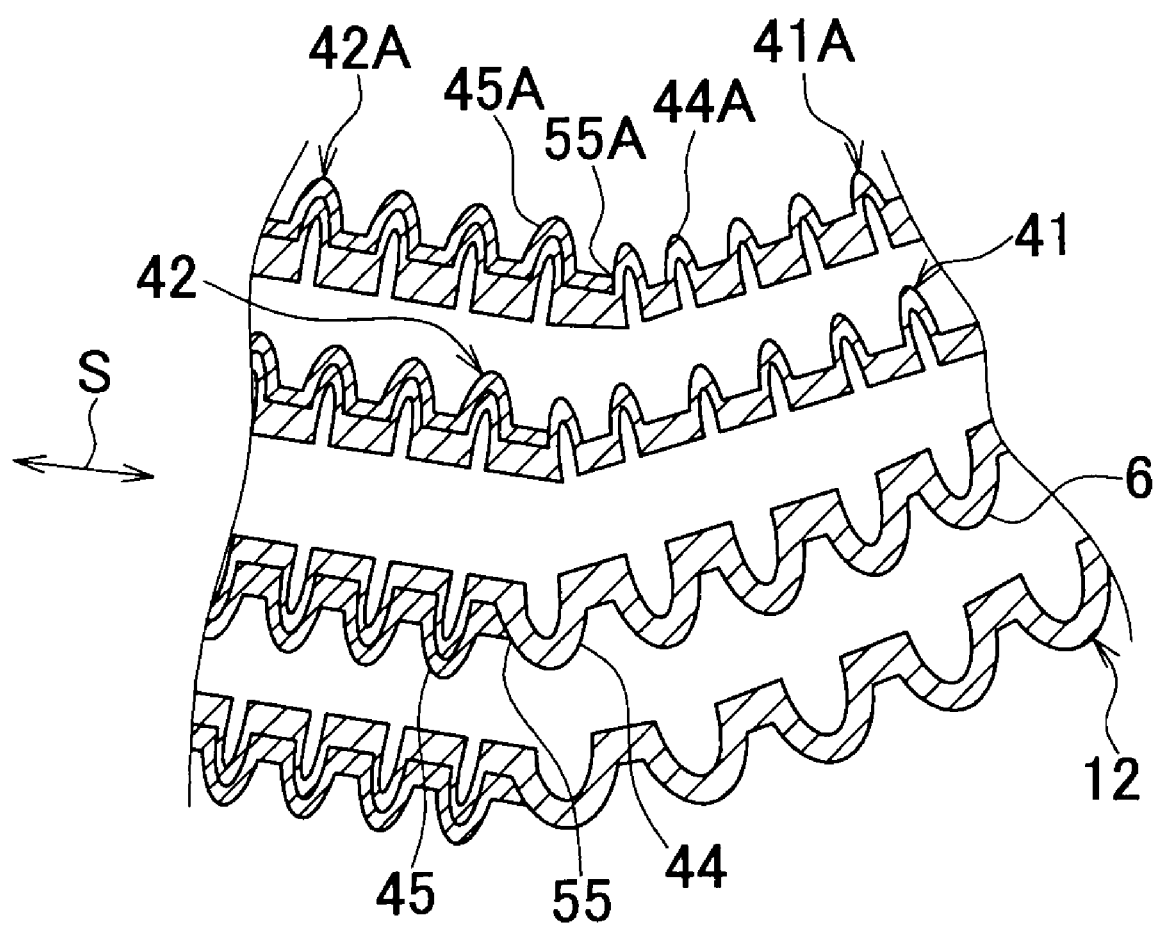
FIG. 5 is a cross-sectional view showing movements of the principal part of the power steering system of FIG. 4 when an interior impact occurs.

One end (the upper end) of the second corrugated tube 45A may be coextensive with one end (the upper end) of the second corrugated tube 45 in the axial directions S. With this arrangement, when an interior impact occurs, and impact energy equal to or greater than a specified value is applied from the driver to the steering shaft 3 in a direction inclined relative to the axial directions S, a first impact absorbing portion 41A of the first column tube 12A bends, and the first impact absorbing portion 41 of the first shaft 6 bends, as shown in FIG. 5. A boundary portion 55A at which the first column tube 12A bends is substantially aligned with the boundary portion 55 at which the first shaft 6 bends, in the axial directions S.

Figure 6:
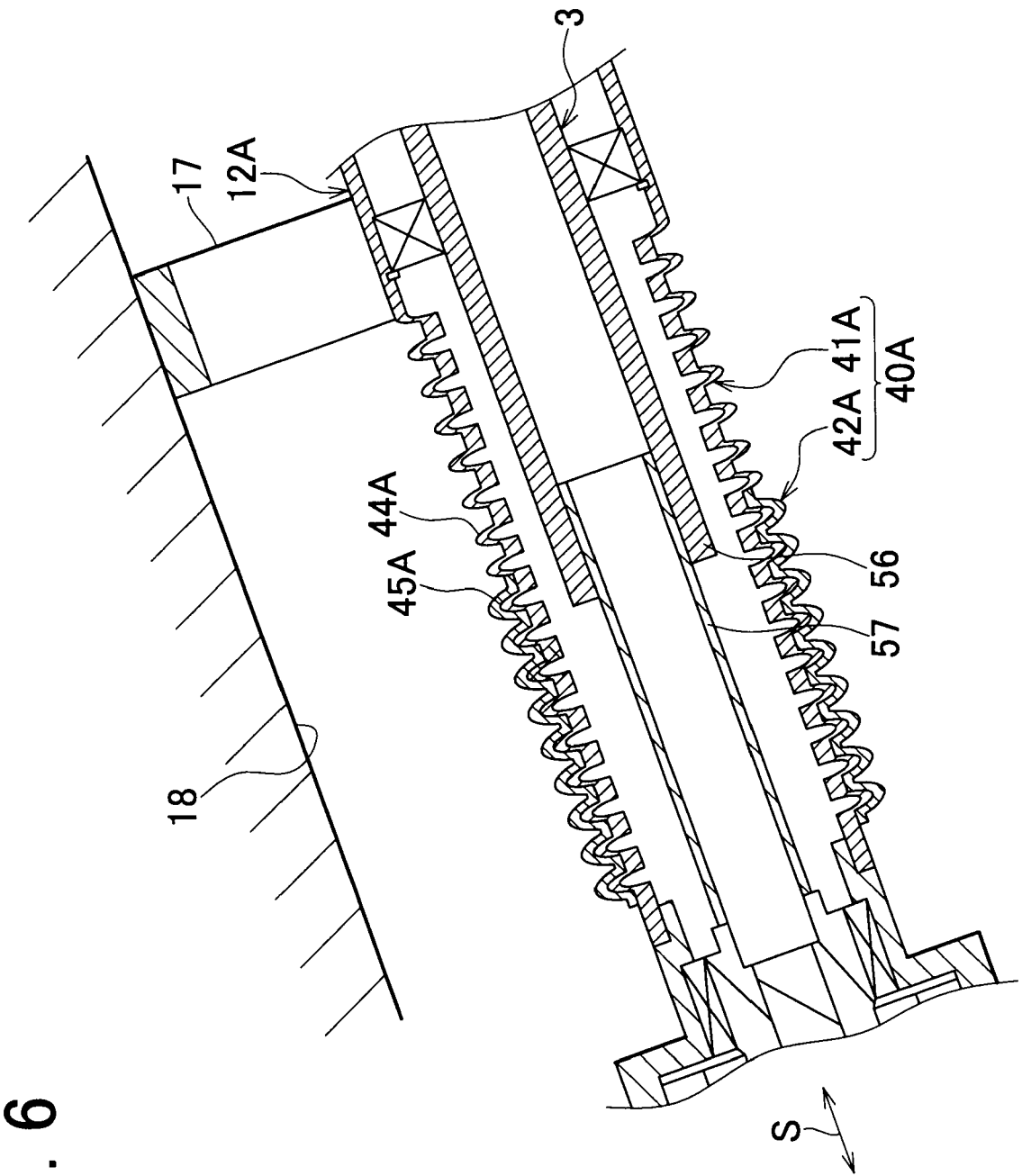
FIG. 6 is a cross-sectional view of a principal part of an energy absorbing steering system according to a further embodiment of the invention.

In the arrangement as described above, the second corrugated tube 45 may be eliminated. Also, in the arrangement as shown in FIG. 4, the first and second corrugated tubes 44, 45 may be replaced with first and second cylindrical portions 56, 57, as shown in FIG. 6. The first cylindrical portion 56 is a high-rigidity member that is relatively thick in comparison to the second cylindrical portion 57, and has relatively high flexural rigidity. The second cylindrical portion 57 is a low-rigidity member that is relatively thin in comparison to the first cylindrical portion 56, and has relatively low flexural rigidity. The inner circumferential surface of one end portion of the first cylindrical portion 56 is fitted on the outer circumferential surface of one end portion of the second cylindrical portion 57 by, for example, spline fitting, such that the first and second cylindrical portions 56, 57 can slide relative to each other.

Figure 7:
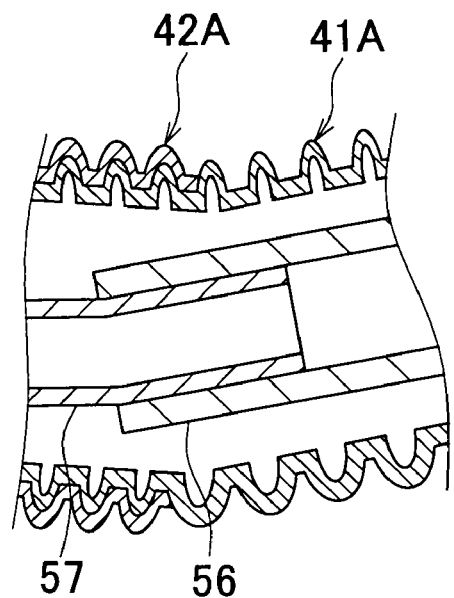
FIG. 7 is a cross-sectional view showing movements of the principal part of the power steering system of FIG. 6 when an interior impact occurs.

With this arrangement, if an interior impact occurs, and impact energy equal to or greater than a specified value is applied from the driver to the steering shaft 3 in a direction inclined relative to the axial directions S of the steering shaft 3, the first impact absorbing portion 41A bends, and the second cylindrical portion 57 bends, as shown in FIG. 7. It is also possible to superimpose three or more corrugated tubes on each other to form the second impact absorbing portion 42 or 42A.

Figure 8:
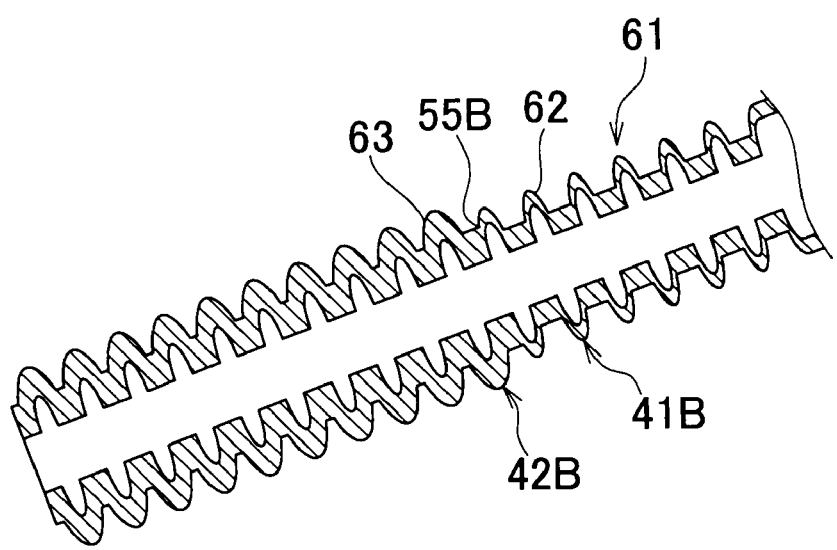
FIG. 8 is a cross-sectional view of a principal part of an energy absorbing steering system according to a still another embodiment of the invention.

Also, the first and second corrugated tubes 44, 45 of the steering shaft 3 may be replaced with a composite corrugated tube 61 as shown in FIG. 8. The composite corrugated tube 61 is formed as a single unit made of a single material, and includes a thin corrugated tube 62 having a relatively small thickness and a thick corrugated tube 63 having a relatively large thickness. The thin corrugated tube 62 has substantially the same shape as the non-superimposed region 53 (see FIG.

2). The thick corrugated tube 63 has substantially the same shape as the superimposed region 54 (see FIG. 2).

The thin corrugated tube 62 and thick corrugated tube 63 extend continuously from each other, and have different thicknesses. The thin corrugated tube 62 provides a first impact absorbing portion 41B, and the thick corrugated tube 63 provides a second impact absorbing portion 42B. The first impact absorbing portion 41B and second impact absorbing portion 42B are connected to each other at a boundary portion 55B.

In this case, it is possible to set different impact absorption loads using a single corrugated tube, while reducing the number of components. The first and second corrugated tubes 44A, 45A of the first column tube 12A may also be replaced with a composite corrugated tube similar to the composite corrugated tube 61 as described above.

Also, the first impact absorbing portion and the second impact absorbing portion may be formed of different materials, such that the first impact absorbing portion is formed of a material having lower rigidity than that of the second impact absorbing portion.

The present invention may also be applied to a tilt steering system for adjusting the position of the steering column about a pivot or tilt center. The invention may also be applied to other types of electric power steering systems, such as a column-type electric power steering system in which an electric motor that provides steering assist is not disposed coaxially with the steering shaft, or may also be applied to manual steering systems, where no steering assist device is provided.

What is claimed is:

1. An energy absorbing steering system, comprising:
   a steering shaft including a first end and a second end;
   a steering member, coupled to the first end of the steering shaft; and
   a steering column that rotatably supports the steering shaft, wherein
   at least one of the steering shaft and the steering column includes an impact absorbing portion that contracts when a load equal to or higher than a predetermined value is applied,
   the impact absorbing portion includes a first impact absorbing portion having a first impact absorption load, and a second impact absorbing portion having a second impact absorbing load, and
   the first and second impact absorbing portions include corrugated tubes that extend continuously from each other.

2. The energy absorbing steering system according to claim 1, wherein
   the impact absorbing portion includes a first corrugated tube and a second corrugated tube that covers a part of the first corrugated tube, and
   the first impact absorbing portion includes a part of the first corrugated tube which is not covered with the second corrugated tube, and the second impact absorbing portion includes said part of the first corrugated tube which is covered with the second corrugated tube.

3. The energy absorbing steering system according to claim 1, wherein the corrugated tubes have different thicknesses.

4. The energy absorbing steering system according to claim 1, wherein the first impact absorption load of the first impact absorbing portion is lower than the second impact absorption load of the second impact absorbing portion.

5. The energy absorbing steering system according to claim 4, wherein the first impact absorbing portion is located closer to the steering member than the second impact absorbing portion.

6. The energy absorbing steering system according to claim 1, wherein
   the second impact absorbing portion includes a plurality of tubes,
   one of the plurality of tubes is disposed to surround another of the plurality of tubes, and
   a number of the tubes of the second impact absorbing portion is larger than a number of the first impact absorbing portion.

7. The energy absorbing steering system according to claim 1, wherein each of the first and second impact absorbing portions consists of one cylindrical member.

8. The energy absorbing steering system according to claim 1, wherein the first impact absorbing portion is formed of a material having lower rigidity than the material of which the second impact absorbing portion is formed.

9. The energy absorbing steering system according to claim 1, further comprising:
   an output shaft coupled to the second end of the steering shaft via a torsion bar;
   an electric motor that provides steering assist and includes a rotor which is coaxially mounted on the output shaft and which rotates together with the output shaft; and
   a restricting member which is provided at an end of the steering column and which restricts movement of the steering column in an axial direction of the steering shaft with respect to the electric motor.

10. The energy absorbing steering system according to claim 9, wherein the restricting member is a motor housing that accommodates the electric motor.

11. The energy absorbing steering system according to claim 9, wherein
    the steering column includes a first column tube including an upper column tube that surrounds the first impact absorbing portion and a lower column tube that surrounds the second impact absorbing portion,
    the lower column tube is fitted within the upper column tube such that the upper and lower column tubes slide in an axial direction relative to each other, and
    a flexural rigidity of the upper column tube is higher than a flexural rigidity of the lower column.

12. The energy absorbing steering system according to claim 11, wherein
    the upper column is attached via an upper bracket on a vehicle body, and
    the upper bracket is arranged such that the upper bracket separates from the vehicle body when a predetermined amount of load is applied to the upper bracket.

13. The energy absorbing steering system according to claim 12, wherein the steering column is further attached to the vehicle body via a lower fixed bracket such that the steering column is pivotally supported by the lower fixed bracket.

14. The energy absorbing steering system according to claim 1, wherein
    the steering column includes a first column tube including an upper column tube that surrounds the first impact absorbing portion and a lower column tube that surrounds the second impact absorbing portion,
    the lower column tube is fitted within the upper column tube such that the upper and lower column tubes slide in an axial direction relative to each other, and
    a flexural rigidity of the upper column tube is higher than a flexural rigidity of the lower column.

15. The energy absorbing steering system according to claim 14, wherein
the upper column is attached via an upper bracket on a vehicle body, and
the upper bracket is arranged such that the upper bracket separates from the vehicle body when a predetermined amount of load is applied to the upper bracket.

16. The energy absorbing steering system according to claim 15, wherein the steering column is further attached to the vehicle body via a lower fixed bracket such that the steering column is pivotally supported by the lower fixed bracket.

17. An energy absorbing steering system, comprising:
a steering shaft including a first end and a second end;
a steering member, coupled to the first end of the steering shaft; and
a steering column that rotatably supports the steering shaft, wherein
at least one of the steering shaft and the steering column includes an impact absorbing portion that contracts when a load equal to or higher than a predetermined value is applied,
the impact absorbing portion includes a first impact absorbing portion including a first impact absorption load, and a second impact absorbing portion including a second impact absorbing load,
the first and second impact absorbing portions include tubes that are coaxial with the steering shaft, and
a tube of the first impact absorbing portion has a smaller thickness than a tube of the second impact absorbing portion.

18. An energy absorbing steering system, comprising:
a steering shaft including a first end and a second end;
a steering member, coupled to the first end of the steering shaft; and
a steering column that rotatably supports the steering shaft, wherein
at least one of the steering shaft and the steering column includes an impact absorbing portion that contracts when a load equal to or higher than a predetermined value is applied,
the impact absorbing portion includes a first impact absorbing portion including a first impact absorption load, and a second impact absorbing portion including a second impact absorbing load,
each of the steering shaft and the steering column includes the impact absorbing portion, which includes the first impact absorbing portion and the second impact absorbing portion, respectively, and
the first and second impact absorbing portions of the steering shaft are coaxial with the corresponding first and second impact absorbing portions of the steering column in an axial direction of the steering shaft.

* * * * *